June 18, 1963 G. R. ROOT 3,093,948
ROTATING DISK MOWER WITH VERTICALLY ADJUSTABLE ROTATING BLADE
Filed Sept. 11, 1961 2 Sheets-Sheet 1
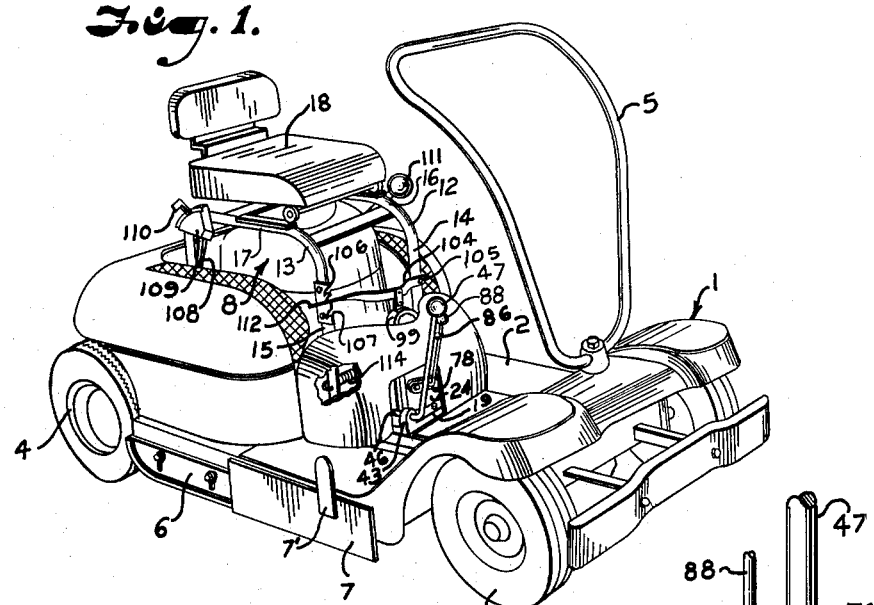
INVENTOR.
GEORGE R. ROOT
BY
Fishburn & Gold
ATTORNEYS June 18, 1963  G. R. ROOT  3,093,948
ROTATING DISK MOWER WITH VERTICALLY ADJUSTABLE ROTATING BLADE
Filed Sept. 11, 1961  2 Sheets-Sheet 2
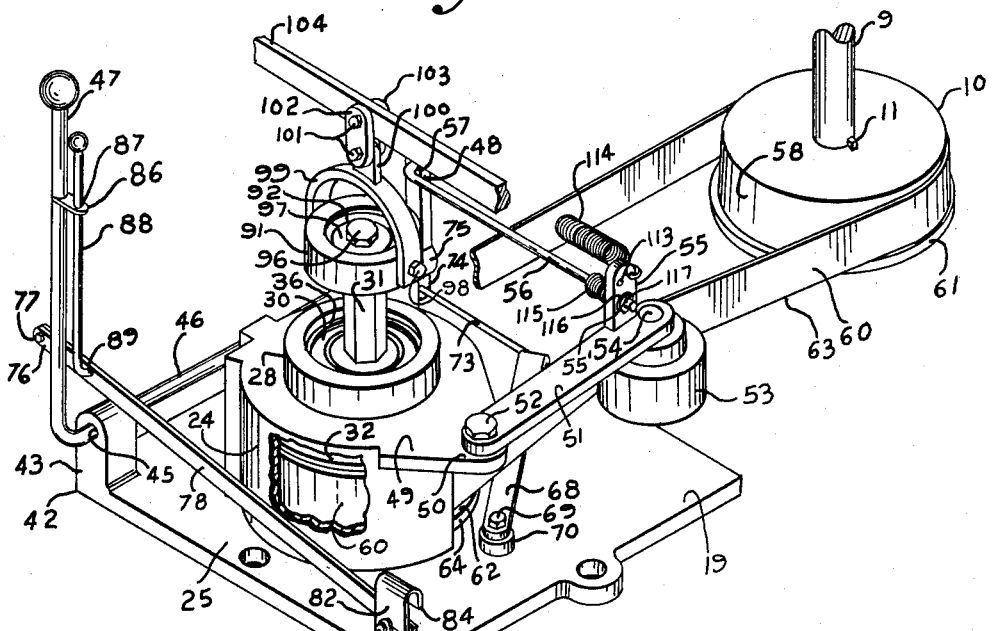
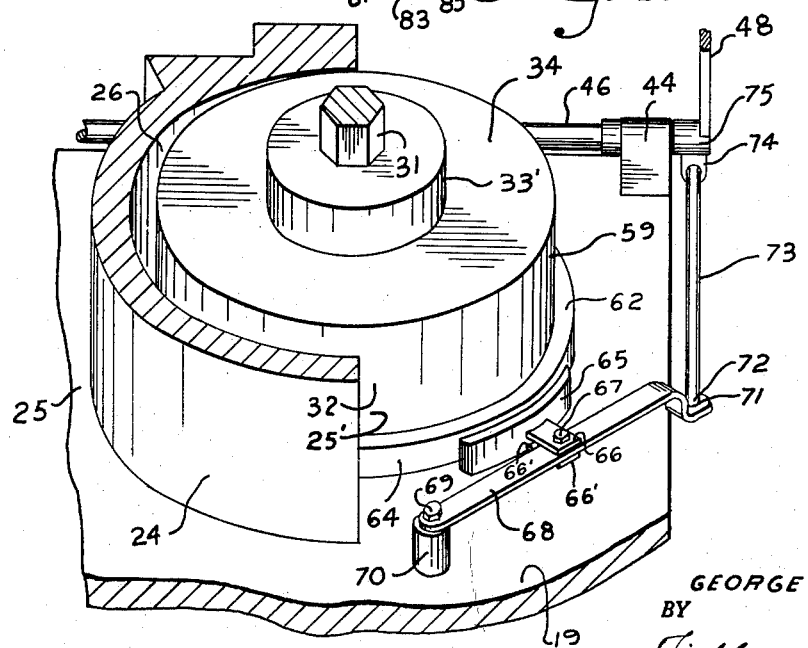
INVENTOR.
GEORGE R. ROOT
BY
Fishburn & Gold
ATTORNEYS

United States Patent Office 3,093,948
Patented June 18, 1963

3,093,948
ROTATING DISK MOWER WITH VERTICALLY
ADJUSTABLE ROTATING BLADE
George R. Root, Baxter Springs, Kans., assignor to Root
Manufacturing Company, Inc., Baxter Springs, Kans.,
a corporation of Kansas
Filed Sept. 11, 1961, Ser. No. 137,097
1 Claim. (Cl. 56—25.4)

This invention relates to improvements in wheeled supported mowers for cutting grass and weeds and more particularly to improvements for driving and braking the cutter shaft and vertically adjusting the cutter blade shaft to raise or lower the same while the blade is in operation or while the blade is stationary.

In most mowers of this character it is necessary to adjust the cutting height of the blades by removing the blade and changing the blade with respect to the shaft upon which it is mounted or to adjust the wheels of the mower with respect to the frame to raise and lower the frame with respect to the ground. This takes time and loosening of bolts and replacing them.

Others have attempted to provide means for holding the blade stationary when the mower is inoperative and the engine running and there have been some attempts made to provide a free running belt arrangement with respect to the blade, but so far as applicant is aware no one has provided brake means for holding the blade stationary when not in cutting operation.

The principal object of the present invention is to provide means for raising and lowering the cutting blade attached to the shaft driven by the motor of the vehicle without loosening of bolts or other mechanism and which can be accomplished during operation of the mower, if desired, and to provide means for braking the blade and shaft to hold the same stationary when the mower is not operating yet while the engine is still running.

Further objects of the present invention are to provide a wheeled vehicle having a motor with a drive shaft mounted upon a platform of the vehicle and the rotary blade cutter below the platform mounted upon the shaft which is movable in a vertical position with respect to the platform by a lever mechanism attached to the frame of the vehicle and having connection with the blade shaft to raise and lower the same while the vehicle is either in immobile position or while it is traveling over the ground; to provide a housing mounted on the platform carrying spaced bearings on the shaft and through which the shaft may be moved vertically; to provide a pulley on the shaft having belt connection with a pulley on the motor drive shaft carried by the platform of the vehicle; to provide a housing for the pulley on the blade shaft having a lever carrying an idler pulley for engaging the belt to tighten the belt upon operation of a lever to start rotation and maintain rotation of the shaft and the cutting blade thereon; to provide spring urged means for maintaining the idler pulley in contact with the driving belt; to provide the pulley on the blade shaft and on the motor shaft with a flange on the lower side thereof and extending around the periphery of the pulley to retain the belt thereon; to provide the flange on the blade pulley with a surface to be contacted by a brake shoe; to provide means for mounting the brake shoe on the platform and operable by release of the lever which releases the idler pulley from the belt and automatically causes the brake shoe to engage the blade pulley to stop the same from rotation.

Still further objects of the present invention are to provide a locking lever carried by the lever for operation of the idler pulley to control driving of the belt on the motor shaft pulley and on the blade shaft so that when the brake shoe engages the surface of the flange on the blade pulley it may be locked in position to hold the blade stationary while the motor or engine of the vehicle is still operating, and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a perspective view of a mower embodying the features of my invention with parts broken away to better illustrate the same.

FIG. 2 is a cross-sectional enlarged view particularly illustrating the mechanism for mounting the blade shaft for raising and lowering the same with respect to the frame of the mower.

FIG. 3 is an enlarged partly fragmentary perspective view of the driving mechanism and belt arrangement and braking mechanism therefor.

FIG. 4 is an enlarged partly fragmentary view of the pulley on the blade shaft and the mechanism for braking the same.

FIG. 5 is an enlarged fragmentary view of the lever mechanism and locking means for holding the brake mechanism in position.

Referring more in detail to the drawings:

1 designates a mower upon which my improved mechanism is used the mower comprising the usual housing or platform 2 supported by front wheels 3 and rear wheels 4 and steering mechanism including a steering handle 5. The platform has adjustable depending sides 6 and a baffle plate 7 engaging upon a hook 7' which extends over an opening (not shown) in the housing through which the grass may be exhausted by removal of the baffle plate 7 when desired.

8 designates a motor having a drive shaft 9 which is mounted on the platform 2 and a pulley 10 is keyed to the shaft 9, as indicated at 11 (FIG. 3). The mower is self-propelled by mechanism having connection with the motor 8 and which mechanism is not shown here in detail.

Mounted upon the platform 2 over the motor 8 are spaced U-shaped frame members 12 and 13 having vertical legs 14 and 15 forwardly of the motor and horizontal arms 16 and 17 upon which a seat 18 is mounted.

Mounted upon the platform 2 and forwardly of the motor is a plate member 19 secured to the platform by bolts 20 and 21 on each side thereof and the platform is provided near its center and forwardly of the longitudinal center with an opening 22 aligning with an opening 22' in the platform 2, the opening 22 having a boss 23 surrounding the same and extending upwardly therefrom. The plate member 19 has a housing 24 which extends upwardly from the forward portion 25 of the plate member and has an open rear portion, as indicated at 25'. The housing 24 is offset inwardly forming a chamber 26 and has an opening 27 near the center thereof with an upstanding boss 28. A ball bearing 29 is mounted within the boss 23 and a ball bearing 30 is mounted within the boss 28. A shaft 31 extends through said opening 22' in the platform and through bearings 29 and 30 and is slidable vertically therethrough. A pulley 32 is mounted upon the shaft 31 and within the chamber 26 of the housing 24. A spacer 33 is provided between the pulley 32 and the bearing 29 and a spacer 33' is provided between the top 34 of the pulley and the bearing 30. A keeper member 35 is mounted within the boss 23 under the bearing 29 and a keeper member 36 is mounted in the boss 28 above the bearing 30. A blade 37 is mounted upon the lower end of the shaft 31 by a threaded bolt 38 engaging within a threaded socket 39 in the end of the shaft. A stabilizer member 40 is provided for engaging around the bolt 38 and is secured to the blade by spaced bolts 41 (FIG. 2).

One side 42 of the plate 19 is provided with upstanding brackets 43 and 44 having openings 45 therethrough in which a rod 46 is rotatable. On the forward end of the rod 46 is a transversely turned and upwardly extending lever arm 47 and on the opposite end and rigidly secured thereto is an arm 48.

Extending from one side of the top 49 of the housing 24 and oppositely of the lever 47 is an extension 50 to which is pivotally mounted a bracket arm 51 by a bolt or the like 52, on the free end of which and extending downwardly thereof is an idler pulley 53, the pulley being mounted on the arm by a pin 54. Extending upwardly from one side of the bracket arm 51 adjacent the idler pulley 53 is a lug 55 having an opening 55' for receiving one end of a link 56 having its other end turned laterally and extending through an opening 57 near the upper end of the arm 48. The pulleys 10 and 32 have a vertical cylindrical surface, as indicated at 58 and 59, for receiving a flat belt 60 and against one side of which the idler pulley engages, as indicated in FIG. 3. The lower side edges of the pulleys 10 and 32 have peripheral flanges 61 and 62 against which the lower side edge 63 of the belt will engage. The flange 62 on the pulley 32 provides a cylindrical braking surface 64 against which a brake shoe 65 engages. The brake shoe is mounted upon spaced arms 66 and 66' which in turn are pivotally mounted by a pin 67 to a bracket arm 68 which is pivotally mounted upon the platform 19 by a bolt 69 and a spacer 70. The free end of the bracket arm 68 is turned laterally downwardly and outwardly and provided with an opening 71 through which the end 72 of a link arm 73 extends and having its opposite end secured to a depending lug 74 mounted on a collar 75 on the end of the rod 46 to which the lower end of the arm 48 is rigidly attached.

The mechanism just above described is for rotation of the blade shaft 31 which is of hectagon shape and the pulley 32 being mounted thereon for rotation therewith. The mechanism just described also includes the braking mechanism for stopping rotation of the blade and shaft when the idler pulley 53 is disengaged from the belt 60.

In order to hold the blade and blade shaft stationary by the brake mechanism on the pulley 32, I have provided a lug 76 extending outwardly from the side of the lever 47 near the lower end thereof to which is pivotally attached by a pin 77 a brake locking lever 78 having its free end provided with a notch 79 for engaging a pin 80 mounted in a slot 81 of a stand 82 secured to the corner 83 of the plate 19 on the opposite side from the lever 47 by bolts 83'. The upper end of the stand is curved and turned downwardly, as indicated at 84 for retaining the end 85 of the lever arm therein. The lever 47 is provided near its upper end with a lug 86 having an opening 87 therein and through which slidably extends the brake locking lever control rod 88 having its lower end turned laterally and extending through an opening 89 in the lever 78, as illustrated in FIG. 3.

The upper end of the shaft 31 is offset forming a shoulder 90 and mounted thereon is a collar 91 housing a bearing 92 and retained on the reduced end 93 of the shaft by a keeper plate 94. The upper end of the shaft is provided with a threaded socket 95 for receiving the threaded shank of a pin 96 extending through a washer 97 for retaining the bearing in place on the shaft.

Pivotally mounted on the housing collar 91 by bolts or the like 98 is a bail or yoke member 99 having an upstanding lug 100 to which is pivotally attached by a bolt 101 spaced link member 102 and 103 between which is mounted a lift yoke link 104 having one end pivotally mounted by a pin 105 to the standard 14 of the seat frame and its other end engaging a notched plate 106 secured to the post 15 of the seat frame, the notched plate having a plurality of notches, as indicated at 107 (FIG. 1).

The mower is a push button starter type having a battery (not shown) with throttle wires 108 leading to a control mechanism 109 mounted upon the U-shaped frame member 13, as illustrated in FIG. 1 and having a speed control lever 110 for the driving mechanism (not shown) for the mower which is operated by the engine 8. The gear of the driving mechanism is regulated by a lever 111.

Operation of the structure assembled as described is as follows: the height of the blade with respect to the platform of the mower may be set before the mower is in forward operation or it may be set while the mower is moving. In order to adjust the height for cutting the grass or weeds the end 112 of the yoke lever link 104 is disengaged from notches 107 of the notch plate 106 and movement of the end 112 upwardly will move the shaft 31 upwardly through the bearings 29 and 30 in the housing assembly and thus the grass will be cut longer and movement of the yoke lever 104 downwardly will lower the shaft through the bearings to cut the grass shorter. As above stated, this can be done even during operation of the mower if desired.

Movement of the lever arm 47 to the left as viewed in FIG. 3 will rotate the rod 46 and arm 48 attached thereto to pull the link rod 56 attached to the lug 55, which in turn is mounted on the bracket arm 51 upon which the pulley 53 is mounted, will pull the pulley in contact with the belt 60 to start rotation of the pulley 32 and consequently the blade shaft 31 and blade 37.

The upper end of the lug 55 is provided with an opening 113 for receiving one end of a coil spring 114 having its other end secured to the post 15 of the seat frame as illustrated in FIG. 1 to provide a tension on the idler pulley 53 to retain the same in contact with the belt 60 for driving the blade shaft 31. A coil spring 115 is mounted upon the link rod 56 adjacent the lug 55 and held thereon by a pin (not shown) and a washer 116 is provided on the outer end of the rod and keyed thereto by a cotter pin 117 so as to provide a resilient contact of the idler pulley 53 with the belt 60.

At the same time the lever 47 is moved to the left the lug 74 on the collar 75 on the opposite end of the rod 46 will be moved to the right to cause the link arm 73 to move the outer end of the bracket arm 68 outwardly carrying with it the brake shoe 65 so that the pulley 32 will be unimpeded in its rotation with the shaft 31.

When it is desired to stop rotation of the blade 37 and shaft 31 the lever 47 is moved to the right as viewed in FIG. 3 whereby the arm 48 will have a pushing effect on the link rod 56 to move the idler pulley 53 out of contact with the belt 60 and at the same time the lug 74 will move to the left exerting a pull on the link arm 73 to move the outer end of the bracket arm 68 to the left or inwardly toward the pulley 32 carrying with the brake shoe 65 to engage the surface 64 of the pulley 32 to stop rotation of the shaft 31 and consequently the cutting blade 37. The notch 79 has a cam surface 79' so that when the lever arm 47 is moved to the right it will cause the brake locking lever to disengage from the pin 80. When the brake shoe is fully engaged with the pulley 32 the lever 88 may be pushed downwardly to cause the notch 79 to engage with the pin 80 to hold the brake in locking position to prevent rotation of the blade and shaft. It will be obvious by upward pull on the arm 88 the free end of the arm 78 may be disengaged from the pin 80 if desired. The shaft 31 is provided near its upper end with a transverse opening 118 for receiving a pin 119 having its ends extending outwardly of the shaft to act as a stop to limit downwardly movement of the shaft 31.

It will be obvious from the foregoing that I have provided an improved driving and braking mechanism for a horizontally disposed cutting blade mounted on a shaft and driven by a belt mechanism and wherein the cutting height of the grass may be changed at the will of the operator, either while the mower is standing or while in movement merely by operation of the lever in easy access to the driver of the vehicle.

It is to be understood that while I have illustrated and described one form of my invention, it is not to be limited to the specific form or arrangement of parts herein described and shown except insofar as such limitations are included in the claim.

What I claim and desire to secure by Letters Patent is:

A grass cutting mower comprising, a wheel supported platform, a framework including a pair of spaced legs mounted on said platform, a housing mounted on said platform between said legs, bearing means in said housing, a vertical shaft extending through the platform and through said bearing means and slidable vertically therein, a driving member rotatably supported by said bearing means and rotatably fixed with respect to said shaft and permitting vertical sliding of said shaft therethrough, means for rotating said driving member for rotating said shaft, a cutter blade fixed to the lower end of said shaft, a lever having one end pivotally attached to one of said legs for pivoting in a vertical plane, yoke means spaced above the upper end of said shaft, bearing means operatively connected between said yoke means and said shaft whereby said shaft is rotatable with respect to said yoke means and said shaft is vertically suspended by said yoke means, means spaced above said yoke means for pivotally attaching said lever to said yoke means between the ends of said lever whereby movement of said lever vertically will move said shaft vertically to change the cutting height of said blade, and means on the other of said legs for adjustably engaging the other end of said lever to maintain said shaft in adjusted vertical position, said means for pivotally attaching said lever to said yoke means comprises a link having an upper end and a lower end, said link upper end being pivotally connected to said lever and said link lower end being pivotally connected to said yoke means whereby said lever may be pivoted without jamming.

References Cited in the file of this patent

UNITED STATES PATENTS

| | | |
|---|---|---|
| 1,727,933 | Mitchell | Sept. 10, 1929 |
| 2,229,363 | Bishop | Jan. 21, 1941 |
| 2,899,793 | Swisher | Aug. 18, 1959 |